(12) United States Patent
Furukawa et al.

(10) Patent No.: US 7,722,772 B2
(45) Date of Patent: May 25, 2010

(54) ION EXCHANGE APPARATUS AND METHOD OF CONTROLLING THE SAME

(75) Inventors: Hideo Furukawa, Matsuyama (JP); Hajime Abe, Matsuyama (JP); Makoto Hato, Matsuyama (JP); Hironao Kato, Matsuyama (JP); Kazutaka Baba, Matsuyama (JP)

(73) Assignee: Miura Co., Ltd., Matsuyama-shi (JP)

( * ) Notice: Subject to any disclaimer, the term of this patent is extended or adjusted under 35 U.S.C. 154(b) by 507 days.

(21) Appl. No.: 11/727,100

(22) Filed: Mar. 23, 2007

(65) Prior Publication Data

US 2007/0227976 A1  Oct. 4, 2007

(30) Foreign Application Priority Data

Mar. 29, 2006  (JP) .............................. 2006-089946

(51) Int. Cl.
  *C02F 1/42*  (2006.01)
(52) U.S. Cl. ........................... 210/662; 210/87; 210/88; 210/98; 210/191; 210/278; 210/279; 210/288; 210/289; 210/670; 210/687; 210/739
(58) Field of Classification Search ................... 210/87, 210/88, 98, 190, 191, 662, 670, 739, 687, 210/278, 279, 288, 289
  See application file for complete search history.

(56) References Cited

U.S. PATENT DOCUMENTS 3,146,788 A * 9/1964 Mahlstedt et al. ........... 137/399

| 5,147,531 | A | * | 9/1992 | Dougal ......................... 210/91 |
| 6,596,159 | B1 | | 7/2003 | Maruyama et al. |
| 2003/0052060 | A1 | * | 3/2003 | Teel, Jr. ....................... 210/662 |
| 2009/0114583 | A1 | * | 5/2009 | Yoneda et al. .............. 210/190 |

FOREIGN PATENT DOCUMENTS

| JP | 01056150 A | * | 3/1989 | .................. 210/87 |
| JP | 4-108586 A | | 4/1992 | |

* cited by examiner

*Primary Examiner*—Matthew O Savage
(74) *Attorney, Agent, or Firm*—Birch, Stewart, Kolasch & Birch, LLP

(57) ABSTRACT

The present invention realizes an ion exchange apparatus capable of enhancing the reliability of regeneration operation. Further, the present invention realizes an ion exchange apparatus capable of simplifying the construction of a salt water supply device. The ion exchange apparatus includes a resin bed housing part (2) in which an ion exchange resin bed (5) is housed; a flow passage control valve (3) for switching between a water service operation and a regeneration operation; and a salt water tank (40) for reserving salt water to be used in regeneration, the flow passage control valve (3) being connected to the salt water tank (40) through a salt water supply line (31), in which the salt water supply line (31) is provided with a flow detecting unit (48) for detecting a flow rate in a direction of supplying salt water and a flow rate in a direction of supplying refill water.

5 Claims, 7 Drawing Sheets

ION EXCHANGE APPARATUS AND METHOD OF CONTROLLING THE SAME

BACKGROUND OF THE INVETION

1. Field of the Invention

The present invention relates, to an ion exchange apparatus with an enhanced reliability of regeneration operation and a simplified construction of a salt water supply device.

2. Description of the Related Art

Ion exchange apparatuses for removing hardness components (e.g., calcium ion and magnesium ion), nitrate nitrogen (e.g., nitrate ion and nitrite ion), and so on in raw water such as tap water and underground water, by adsorbing them on an ion exchange resin bed have been known in the art. Among those ion exchange apparatuses, one that substitutes sodium ion or potassium ion for hardness components in water for by using a cation exchange resin is referred to as a water softener. In contrast, among those ion exchange apparatuses, one that substitutes chloride ion for nitrate nitrogen by using an anion exchange resin is referred to as a nitrate nitrogen remover.

When the total amounts of adsorbed specific ions (hardness components and nitrate nitrogen), which are to be removed, reach a predetermined limit of exchange capacity, the ion exchange resin bed begins to leak the specific ions into treated water. Therefore, before the total amounts of the adsorbed specific ions exceed the predetermined limit of exchange capacity, the ion exchange apparatus performs a regeneration operation of bringing the ion exchange resin bed into contact with salt water (specifically, an aqueous sodium chloride solution) to recover its exchange capacity.

The general construction of the ion exchange apparatus is disclosed in, for example, JP 04-108586 A. The ion exchange resin bed is housed in a bomb-shaped resin cylinder (resin tank) having an opened upper part. The top of the resin cylinder is provided with a flow passage control valve for switching between water service operation and regeneration operation. In addition, the ion exchange apparatus is provided with a salt water tank reserving salt water and a salt water valve arranged in the salt water tank, which serve as a salt water supply device for supplying salt water to the ion exchange resin. The salt water valve is connected to the flow passage control valve through the salt water supply line. The salt water tank is designed such that the user supplies regeneration salt regularly to thereinto to generate the salt water.

The regeneration operation generally includes a backwash process, a regeneration process, an extrusion process, a rinsing process, and a water-refill process, which are performed in the stated order. So, the salt water valve is configured to actuate in accordance with the respective processes. In the regeneration process, raw water is passed through an ejector installed in the flow passage control valve and salt water in the salt water tank is then supplied to the ion exchange resin bed using a negative pressure generated in the ejector. At this time, the salt water valve operates to open a passage from the inside of the salt water tank to the flow passage control valve and then operates to block air suction due to the action of a float ball when the salt water is consumed to a predetermined water level. Subsequently, the process switches to the extrusion process when the salt water valve is closed. In other words, in the ion exchange apparatus, the shift from the regeneration process to the extrusion process depends on the operation of the salt valve, and with regard to the processing times for the regeneration process and the extrusion process, only the total processing time is defined.

Further, in the water-refill process, refill water is supplied from the flow passage control valve to the salt water tank. At this time, the salt valve operates to open a passage from the flow passage control valve to an inside of the salt water tank, while it operates to block an injection of refill water by the action of a float valve when the supply of refill water reaches to a predetermined water level. The salt water valve can be produced in mass production from molded parts using a corrosion-resistant synthetic resin material, so it has been employed as a standard mechanism in the ion exchange apparatus.

By the way, in the ion exchange apparatus, the amount of refill water to be supplied is controlled by the operation of the salt water valve. Therefore, when the float valve is stuck by crystalline salt, refill water is not sufficiently supplied, and thus the desired amount of salt water cannot be produced. In addition, in the ion exchange apparatus, the amount of salt water to be supplied is controlled by the operation of the salt water valve. Thus, for example, when the user has forgotten to refill regeneration salt, the desired amount of salt water cannot be produced. Further, in the ion exchange apparatus, the shift from the regeneration process to the extrusion process depends on the operation of the salt water valve. Thus, for example, when the pressure of raw water against the ejector is lowered or when the line for supplying the salt water is clogged, the amount of salt water to be supplied and the amount thereof to be extruded become insufficient. Those deficiencies result in insufficient regeneration and extrusion of the ion exchange resin bed, so such deficiencies have often been constituted causes in deterioration of treated water to be supplied.

Further, the salt water valve has a large number of parts, so the salt water supply device has a complicated construction. Thus, the use of the salt water valve requires much time in assembling and maintenance, thereby causing an increase in costs for production and maintenance.

SUMMARY OF THE INVENTION

The present invention has been made in view of the circumstances described above, and a primary object of the invention is to realize an ion exchange apparatus having an increased reliability of regeneration operation. In addition, a secondary object of the invention is to realize an ion exchange apparatus in which the construction of a salt water supply device may be simplified.

The present invention has been made to attain the above-mentioned object of the invention. An ion exchange apparatus according to a first aspect of the present invention includes: a resin bed housing part in which an ion exchange resin bed is housed; a flow passage control valve for switching between a water service operation and a regeneration operation; and a salt water tank for reserving salt water to be used in regeneration, the flow passage control valve being connected to the salt water tank through a salt water supply line, in which the salt water supply line is provided with a flow detecting means for detecting a flow rate in a direction of supplying salt water and a flow rate in a direction of supplying refill water.

According to the first aspect of the present invention, in a water-refill process, a predetermined amount of refill water is supplied to the salt water tank on the basis of integrated flow rate in the direction of supplying refill water. Therefore, there is no need of using a salt water valve having a large number of structural members to control the amount of refill water to be supplied, so the construction of a salt water supply device can be simplified. In addition, in a regeneration process, on the basis of instantaneous flow rate in the direction of supplying salt water, abnormal regeneration is reported. Therefore, clogging of a salt water supplying system can be found at an early stage, resulting in an increase in reliability of the regeneration operation. Further, in the regeneration process, on the basis of instantaneous flow rate in the direction of supplying salt water, the regeneration process is terminated and then sifted to the extrusion process. Therefore, the desired amount of extrusion can be assured from the initiation of the extrusion process, resulting in an increase in reliability of the regeneration operation. Further, in the regeneration process, on the basis of both integrated flow rate in the direction of supplying salt water and integrated flow rate in the direction of supplying refill water in the water-refill process, shortage of regeneration salt is reported. Therefore, it is possible to promptly cope with the case of forgetting to refill the regeneration salt, thereby increasing the reliability of the regeneration operation.

An ion exchange apparatus controlling method according to a second aspect of the present invention relates to a method of controlling the ion exchange apparatus of the first aspect of the invention, characterized by including: detecting, in a water-refill process, an integrated flow rate in a direction of supplying refill water by a flow detecting means; and terminating the water-refill process when a detected value reaches to a predetermined amount.

According to the second aspect of the present invention, in the water-refill process, the predetermined amount of refill water is supplied to the salt water tank on the basis of integrated flow rate in the direction of supplying refill water. Therefore, there is no need of using any salt water valve having a large number of structural members to control the amount of refill water to be supplied, so the construction of a salt water supply device may be simplified.

An ion exchange apparatus controlling method according to a third aspect of the present invention, in the second aspect of the invention, characterized by further including: detecting, in a regeneration process, an instantaneous flow rate in a direction of supplying salt water by the flow detecting means; and reporting abnormal regeneration when a detected value exceeds zero and is less than a predetermined flow rate.

According to the third aspect of the present invention, in the regeneration process, on the basis of instantaneous flow rate in the direction of supplying salt water, abnormal regeneration is reported. Therefore, clogging of a salt water supplying system can be found at an early stage, resulting in an increase in reliability of the regeneration operation.

An ion exchange apparatus controlling method according to a fourth aspect of the present invention, in the second aspect of the invention, characterized by further including: detecting, in the regeneration process, an instantaneous flow rate in a direction of supplying salt water by the flow detecting means; and terminating the regeneration process and shifting to an extrusion process when a detected value equals to zero.

According to the fourth aspect of the present invention, in the regeneration process, on the basis of instantaneous flow rate in the direction of supplying salt water, the regeneration process is terminated and then sifted to the extrusion process. Therefore, the desired amount of extrusion can be secured from an initiation of the extrusion process, resulting in an increase in reliability of the regeneration operation.

An ion exchange apparatus controlling method according to a fifth aspect of the present invention, in the second or third aspect of the invention, characterized by further including: detecting, in the regeneration process, an integrated flow rate in a direction of supplying salt water by the flow detecting means; and reporting a shortage of regeneration salt when a amount of difference between a detected value and the value detected at a time of the last water-refill process is less than a predetermined amount.

According to the fifth aspect of the present invention, in the regeneration process, on the basis of both integrated flow rate in the direction of supplying salt water and integrated flow rate in the direction of supplying refill water, shortage of regeneration salt is reported. Therefore, it is possible to promptly cope with forgetting to refill the regeneration salt, thereby increasing the reliability of the regeneration operation.

According to the present invention, an ion exchange apparatus, which can enhance the reliability of regeneration operation, can be realized. As a result, an ion exchange resin bed can be effectively prevented from insufficient regeneration and extrusion, and treated water adjusted to a predetermined water quality can be stably supplied. Further, according to the present invention, an ion exchange apparatus capable of simplifying the construction of a salt water supply device can be realized. As a result, the time required for assembling and maintenance of the ion exchange apparatus can be shortened, thereby preventing an increase in costs for production and maintenance.

BEST MODES FOR CARRYING OUT THE INVENTION

First Embodiment

Figure 1:
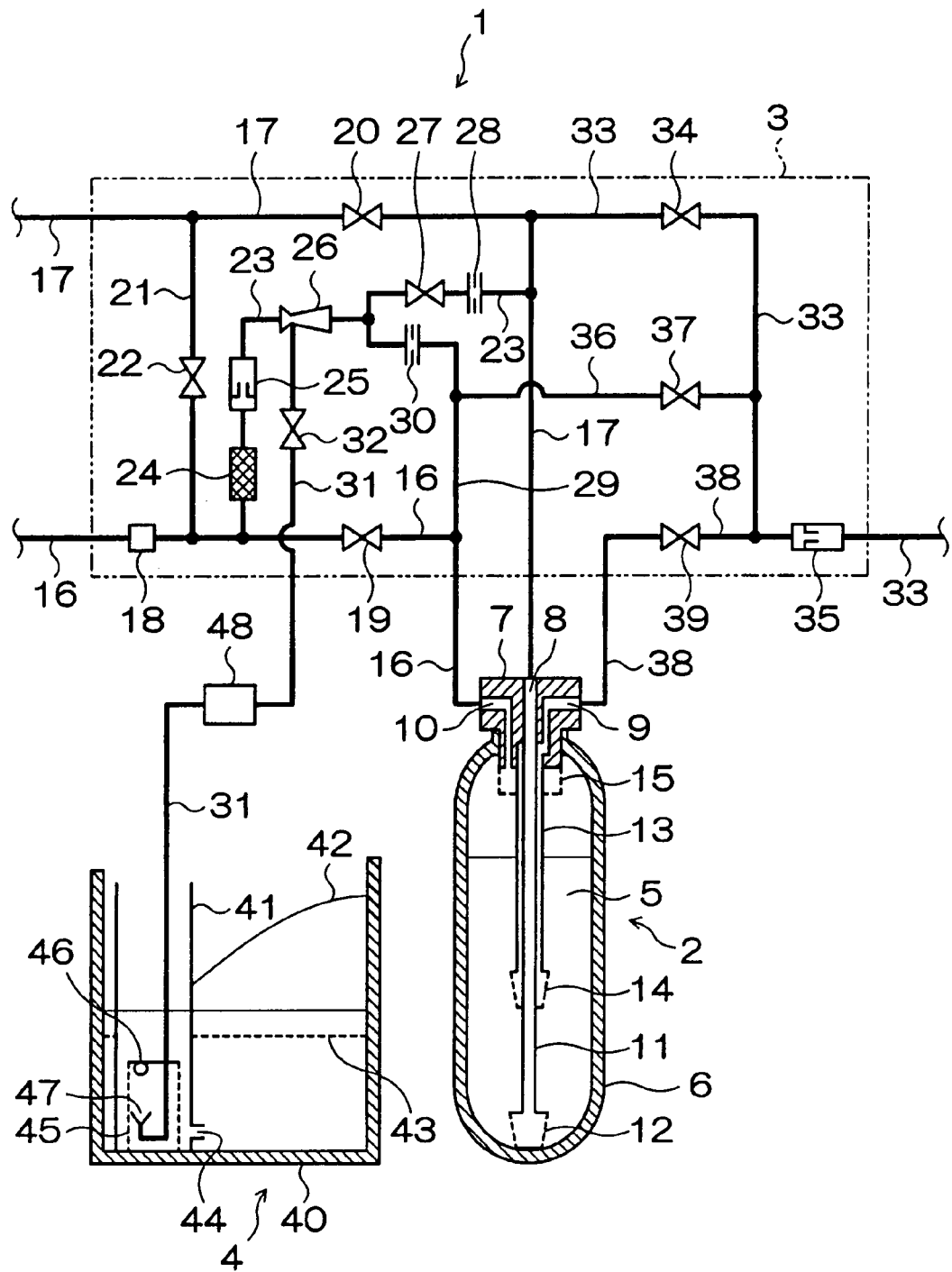
FIG. 1 is a diagram showing an entire construction of an ion exchange apparatus according to a first embodiment of the present invention.

Hereinafter, a first embodiment of the present invention will be described in detail with reference to drawings. FIG. 1 shows a diagram of an entire construction of an ion exchange apparatus according to the first embodiment of the present invention. The ion exchange apparatus of the first embodiment is a so-called water softener that generates soft water by substituting sodium ions for hardness components in raw water such as tap water, underground water, and industrial water. The resulting soft water is then used for supplying as various kinds of water to use points. Therefore, the water softener can be connected to any of water supply sources for residence buildings such as houses and apartments; facilities that attract customers such as hotels and public bathes; heating/cooling equipment such as boilers and cooling towers; appliances for water usage such as food-processing devices and cleaning devices; and so on.

In FIG. 1, an ion exchange apparatus 1 mainly includes a resin bed housing part 2, a flow passage control valve 3, and a salt water supply device 4. The resin bed housing part 2 includes a resin cylinder 6 having a closed bottom end, in which a cation exchange resin bed 5 is housed. The resin cylinder 6 has an opening covered with a cap member 7. The flow passage control valve 3 is integrally attached to the cap member 7 (not shown) and is configured so as to perform the switching between a flow passage for water service operation and a flow passage for regeneration operation in the ion exchange apparatus 1 on the basis of a command signal from a control device (not shown).

In the cap member 7, a first flow passage 8, a second flow passage 9, and a third flow passage 10 for supplying and discharging of a fluid are respectively formed. Each of the flow passages 8, 9, and 10 is connected to each of lines that constitute the flow passage control valve 3 as described below.

In the resin bed housing part 2, the first flow passage 8 is connected to a first header pipe 11 that extends to the bottom portion of the resin cylinder 6. In addition, a first screen member 12 for preventing resin beads from flowing out is attached on the tip of the first header pipe 11. In other words, the first header pipe 11 communicates with the first flow passage 8 and a water-collecting position of the first screen member 12 is set to the bottom portion of the resin cylinder 6.

In the resin bed housing part 2, the second flow passage 9 is connected to a second header pipe 13 that extends to the vicinity of the middle portion of the cation exchange resin bed 5. In addition, a second screen member 14 for preventing resin particles from flowing out is attached on the tip of the second header pipe 13. In other words, the second header pipe 13 communicates with the second flow passage 9 and a water-collecting position of the second screen member 14 is set to the middle portion of the cation exchange resin bed 5.

The inner diameter of the second header pipe 13 is larger than the external diameter of the first head pipe 11. The axial cores of the respective header pipes 11 and 13 are provided coaxially with the axial core of the resin bed housing part 2. In other words, the header pipes 11 and 13 are attached on the resin bed housing part 2 as a water collecting device having a double pipe structure in which the first header pipe 11 is provided as an inner tube and the second header pipe 13 is provided as an external tube.

Further, in the resin bed housing part 2, a third screen member 15 for preventing resin beads from flowing out is attached on the bottom side of the cap member 7. In other words, the third flow passage 10 communicates with the resin bed housing part 2 through the third screen member 15.

A raw water line 16 is connected to the third flow passage 10 through the flow passage control valve 3. In addition, a treated water line 17 is connected to the first flow passage 8 through the flow passage control valve 3. In other words, part of the raw water line 16 and part of the treated water line 17 are formed respectively in the flow passage control valve 3.

The raw water line 16 is provided with a pressure switch 18 and a first valve 19 in the order from the upstream side. The pressure switch 18 is provided for detecting the presence or absence of raw water pressure in regeneration operation as described below. For example, the pressure switch 18 is of a type for switching on or off at pressure of approximately 0.1 MPa required for normally performing the regeneration operation. On the other hand, the treated water line 17 is provided with a second valve 20. The pressure switch 18, the first valve 19, and the second valve 20 each constitute the flow passage control valve 3.

The construction of the flow passage control valve 3 will be further described. In the flow passage control valve 3, the raw water line 16 located upstream of the first valve 19 is connected to the treated water line 17 located downstream of the second valve 20 through a bypass line 21. In addition, the bypass line 21 is provided with a third valve 22.

Further, the raw water line 16 located upstream of the first valve 19 is connected to the treated water line 17 located upstream of the second valve 20 through a first regenerant supply line 23. The first regenerant supply line 23 is provided with a strainer 24, a first constant flow valve 25, an ejector 26, a fourth valve 27, and a first orifice 28 in the order from the raw water line 16 side. In this case, the strainer 24 serves to remove suspended matters from the raw water to prevent both the first constant flow valve 25 and the ejector 26 from clogging. Further, the first constant flow valve 25 serves to adjust the flow rate of raw water supplied to the ejector 26 within a predetermined range.

A portion of the first regenerant supply line 23 between the ejector 26 and the fourth valve 27 is connected to the raw water line 16 located downstream of the first valve 19 through a second regenerant supply line 29. The second regenerant supply line 29 is provided with a second orifice 30. Both the first and second orifices 28 and 30 serve to distribute equally regenerant or raw water to the first and third flow passages 8 and 10, respectively in a regeneration process and an extrusion process to be described below.

The ejector 26 is connected with a salt water supply line 31 extending from the salt water supply device 4 on a ejection side of a nozzle portion (reference numeral is omitted). The salt water supply line 31 is provided with a fifth valve 32. In other words, the ejector 26 is capable of sucking salt water (e.g., a saturated aqueous solution of sodium chloride) from the salt water supply device 4 by means of negative pressure generated by ejecting raw water from the nozzle portion. Further, in the ejector 26, the salt water from the salt water supply device 4 is diluted to a predetermined concentration (e.g., 8 to 12% by weight) with raw water.

The treated water line 17 located upstream of the second valve 20 is connected to a first drain line 33 extending to the outside of the flow passage control valve 3. The first drain line 33 is provided with a sixth valve 34 and a second constant flow valve 35 in the order from the treated water line 17 side. Further, the second regenerant supply line 29 located downstream of the second orifice 30 is connected to the first drain line 33 located downstream of the sixth valve 34 through a second drain line 36. The second drain line 36 is provided with a seventh valve 37.

Further, the second flow passage 9 is connected to the first drain line 33 located downstream of the sixth valve 34 through a third drain line 38. The third drain line 38 is provided with an eighth valve 39. The second constant flow valve 35 serves to adjust the flow rate of waste water drained from the resin bed housing part 2 within a predetermined range.

In the flow passage control valve 3, each of the valves 19, 20, 22, 27, 32, 34, 37, and 39 may employ any of various operation mechanisms and valve structures. Specifically, a valve structure of a lift type or a diaphragm type operated by a cam mechanism, a valve structure of a slide piston type operated by a link mechanism, and the like are particularly preferred.

The construction of the salt water supply device 4 will be described in detail. The salt water supply device 4 is provided with a salt water tank 40. In the salt water tank 40, there are provided a cylindrical salt water well 41, and a salt water plate 43 of water permeability for separating a portion for pooling salt water and a portion for storing solid salt 42 (such as sodium chloride in granular or pellet form). In the lower part of the side wall of the salt water well 41, a communicating hole 44 is formed, and salt water or refill water flows freely through the communicating hole 44.

A salt water strainer 45 is housed in the salt water well 41. In the salt water strainer 45, an air check ball 46 and a valve sheet part 47 are installed, with which the air check ball 46 comes into contact, or from which the air check ball 46 detaches. The valve sheet part 47 is connected to the salt water supply line 31. In other words, the flow passage control valve 3 is connected to the salt water tank 40 through the salt water supply line 31.

Further, the salt water supply line 31 is provided with a flow detecting means 48 for detecting the flow rate of salt water in the direction of supplying the salt water and the flow rate of refill water in the direction of supplying refill water. In addition, a detection signal from the flow detecting means 48 is inputted to the control device. The flow detecting means 48 is a flow rate sensor designed to detect instantaneous flow rate and integrated flow rate in bidirection. A tangential flow rate sensor or an axial flow rate sensor may be preferably utilized as the flow detecting means 48. In addition, the flow detecting means 48 may use two flow rate sensors designed to detect an instantaneous flow rate and an integrated flow rate in a single direction. In this case, a Karman's vortex flow rate sensor, an electromagnetic flow rate sensor, or the like may be employed instead of the tangential flow rate sensor or the axial flow rate sensor.

Hereinafter, the water service operation and the regeneration operation of the ion exchange apparatus 1 according to the first embodiment will be described with reference to FIGS. 2 to 7.

Figure 2:
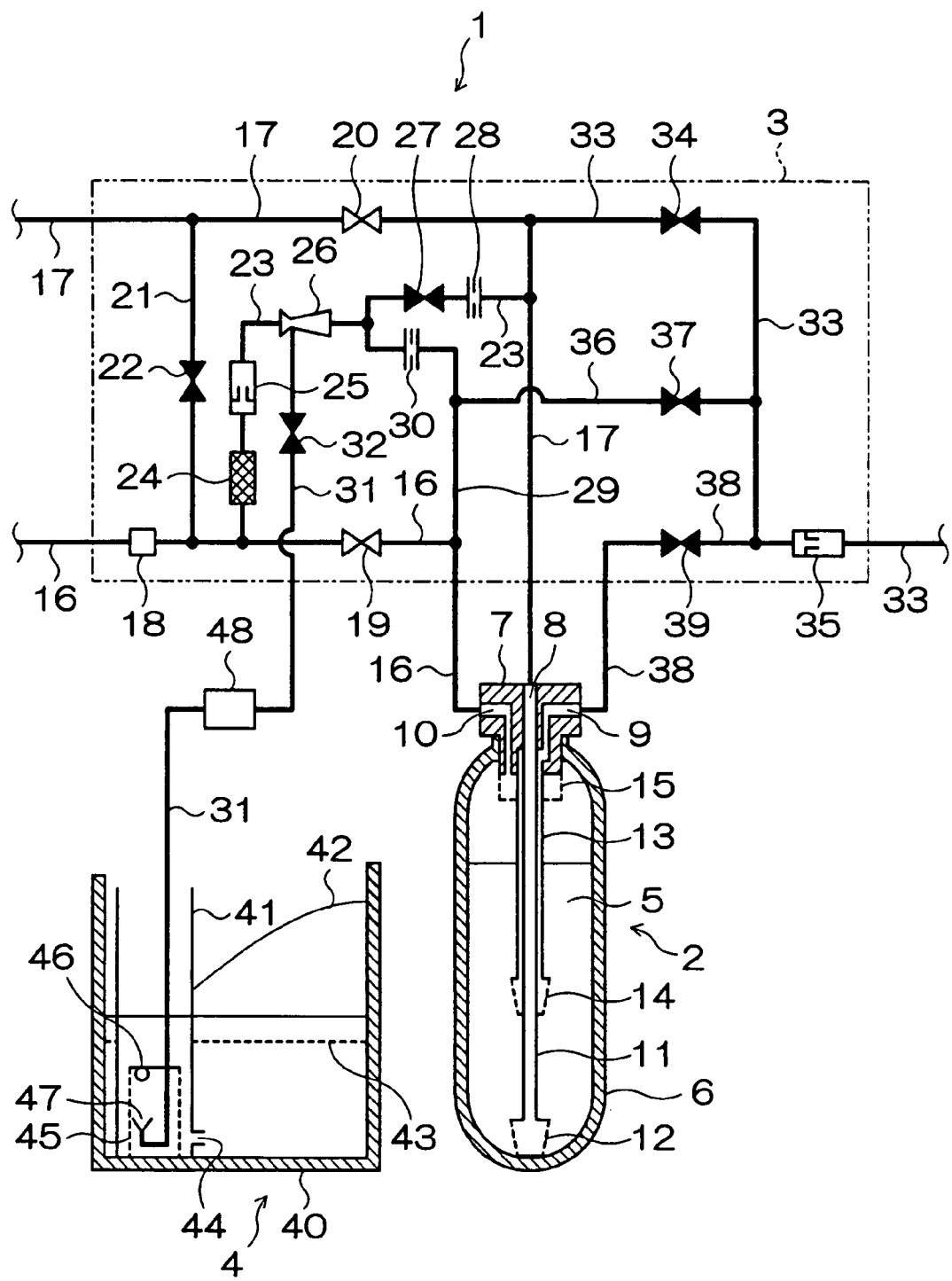
FIG. 2 is a diagram for illustrating a water service operation of the ion exchange apparatus according to the first embodiment of the present invention.

During the water service operation, as shown in FIG. 2, according to the command signal from the control device (not shown), the first valve 19 and the second valve 20 each are set in an open state. On the other hand, the third valve 22, the fourth valve 27, the fifth valve 32, the sixth valve 34, the seventh valve 37, and the eighth valve 39 each are set in a closed state. Raw water such as tap water, underground water, and industrial water flowing through the raw water line 16 is supplied through the third flow passage 10, and subsequently distributed from the third screen member 15 in the upper portion of the resin bed housing part 2.

The raw water distributed from the third screen member 15 is softened by substituting hardness components with sodium ions when the raw water flows downwardly through the cation exchange resin bed 5. The soft water passed through the cation exchange resin bed 5 is collected to the first screen member 12 at the bottom portion of the resin bed housing part 2 and then supplied to use points after flowing through the first header pipe 11, the first flow passage 8, and the treated water line 17. Subsequently, a predetermined amount of soft water is collected and, when the cation exchange resin bed 5 becomes impossible to substitute sodium ions for the hardness components, the regeneration operation is performed.

For recovering the capacity of the cation exchange resin bed 5 to remove hardness components, the regeneration operation includes a backwash process, a regeneration process, an extrusion process, a rinsing process, and a water-refill process will be performed in the stated order. The regeneration operation is set to be performed in midnight in which the soft water is normally not used. However, in the site where the soft water is in demand also at night, a plurality of the ion exchange apparatus 1 are installed in parallel with each other or in series, and are set to alternately perform the water flow operation.

Figure 3:
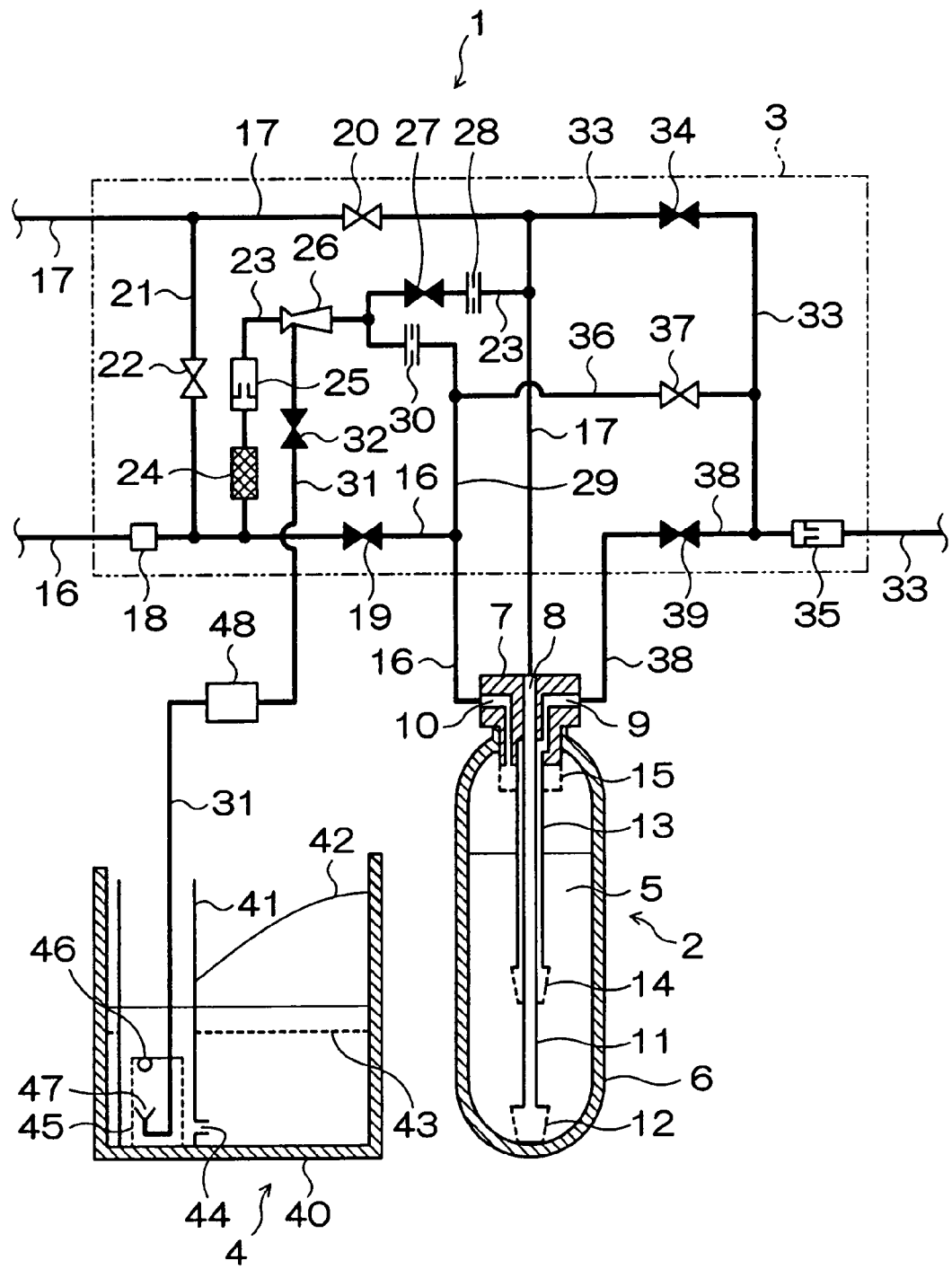
FIG. 3 is a diagram for illustrating a backwash process of the ion exchange apparatus according to the first embodiment of the present invention.

In the backwash process, as shown in FIG. 3, according to the command signal from the control device, the second valve 20, the third valve 22, and the seventh valve 37 each are set to the open state. On the other hand, the first valve 19, the fourth valve 27, and the fifth valve 32, the sixth valve 34, and the eighth valve 39 each are set to the closed state.

Raw water flowing through the raw water line 16 is supplied to the resin bed housing part 2 through the bypass line 21, the treated water line 17, the first flow passage 8, and the first header pipe 11, followed by distribution from the first screen member 12 at the bottom portion of the resin bed housing part 2.

The raw water distributed from the first screen member 12 flows upward in the resin bed housing part 2, and while causing the cation exchange resin bed 5 to expand, the raw water washes away suspended materials which are accumulated or fine resin beads generated by breaking. Subsequently, the raw water passed though the cation exchange resin bed 5 is collected to the third screen member 15 at the upper portion of the resin bed housing part 2 and then discharged to the outside of the system from the first drain line 33 after passing through the third flow passage 10, the raw water line 16, the second regenerant supply line 29, and the second drain line 36. After initiating the backwash process, when an elapsed time during which the pressure switch 18 is in "ON" state (i.e., the state being in the presence of raw water pressure) reaches to a predetermined time and a predetermined amount of backwash is secured, the process shifts to the regeneration process.

Figure 4:
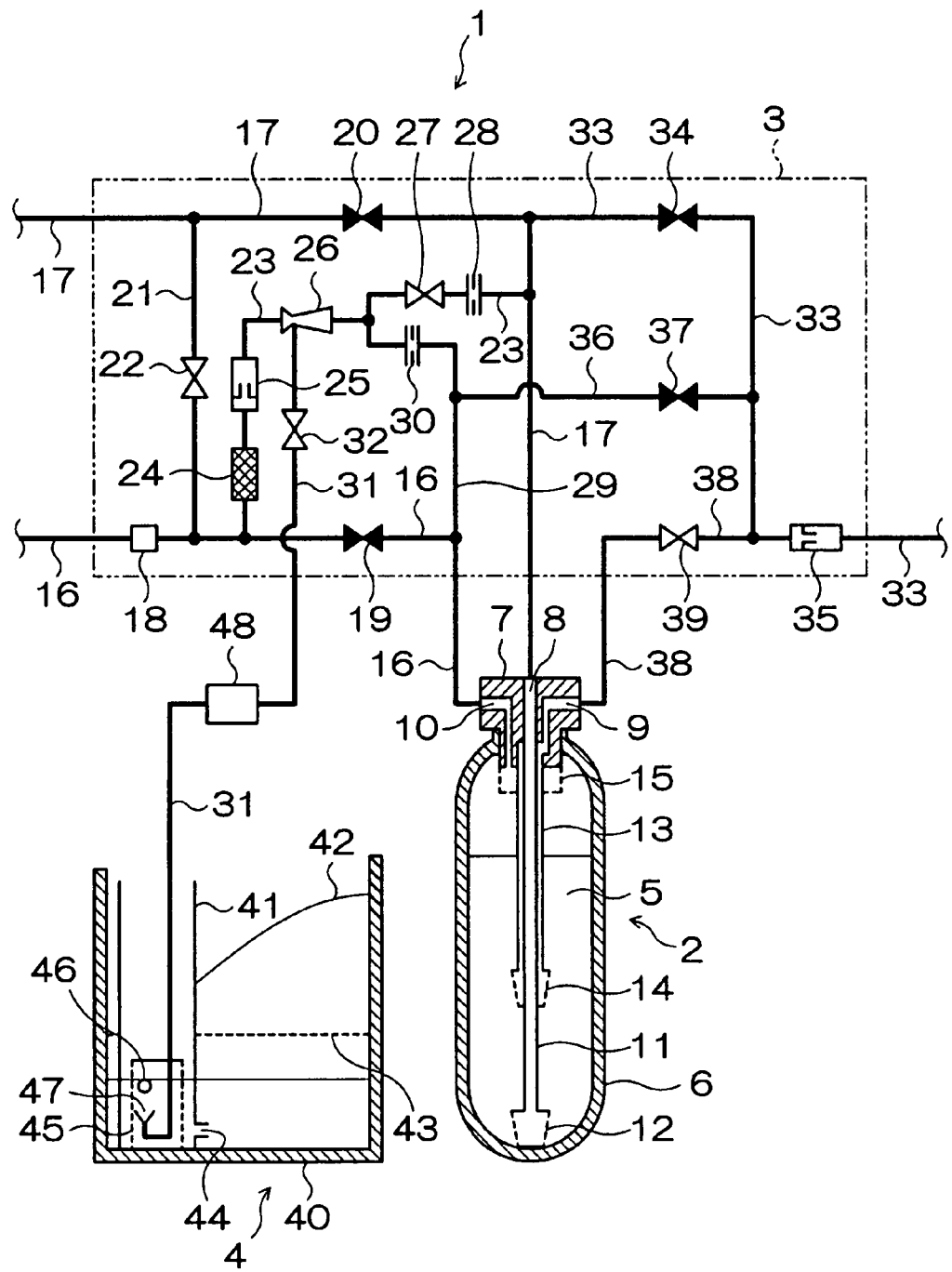
FIG. 4 is a diagram for illustrating a regeneration process of the ion exchange apparatus according to the first embodiment of the present invention.

In the regeneration process, as shown in FIG. 4, according to the command signal from the control device, the third valve 22, the fourth valve 27, the fifth valve 32, and the eighth valve 39 each are set to the open state. On the other hand, the first valve 19, the second valve 20, the sixth valve 34, and the seventh valve 37 each are set to the closed state. Raw water flowing through the raw water line 16 is supplied as dilution water to a primary side of the ejector 26 through the regenerant supply line 23. In this case, suspended matters are removed from raw water by the strainer 24, while the flow rate of raw water is then adjusted within a predetermined range by the first constant flow valve 25.

When a negative pressure is generated on the ejection side of the nozzle portion (reference numeral thereof is omitted) when the raw water passes through the ejector 26, the inner pressure of the salt water supply line 31 becomes negative. As a result, the ejector 26 sucks salt water from the salt water tank 40 through the salt water supply line 31. In the ejector 26, the raw water dilutes salt water to a predetermined concentration, thereby preparing regenerant.

Part of the regenerant from the ejector 26 is supplied to the resin bed housing part 2 through the first regenerant supply line 23, the treated water line 17, the first flow passage 8, and the first header pipe 11 and then distributed from the first screen member 12 at the bottom portion of the resin bed housing part 2. On the other hand, the remainder of the regenerant from the ejector 26 is supplied to the resin bed housing part 2 through the second regenerant supply line 29, the raw water supply line 16, and the third flow passage 10 and then distributed from the third screen member 15 at the upper portion of the resin bed housing part 2. In this case, the regenerant from the ejector 26 is equally divided by the first orifice 28 and the second orifice 30.

The regenerant distributed from the first screen member 12 passes through the cation exchange resin bed 5 with upflow to regenerate the lower part of the cation exchange resin bed 5. On the other hand, the regenerant distributed from the third screen member 15 passes through the cation exchange resin bed 5 with downflow to regenerate the upper part of the cation exchange resin bed 5. In other words, in the first embodiment, split-flow regeneration is performed on the cation exchange resin bed 5. In this case, the regenerant of downflow presses the cation exchange resin bed 5 downward, and inhibits the expansion and the fluidization of the cation exchange resin bed 5 caused by the regenerant of upflow. Subsequently, the reagent passed through the cation exchange resin bed 5 is collected by the second screen member 14 at the middle portion of the cation exchange resin bed 5 and then discharged from the first drain line 33 to the outside of the system through the second header pipe 13, the second flow passage 9, and the third drain line 38.

In the salt water tank 40, salt water is consumed as the regeneration process proceeds, thereby lowering a water level over time. On the other hand, in the salt water strainer 45, the air check ball 46 declines as the water level declines. Further, when the salt water is consumed to a position of the valve sheet part 47, the air check ball 46 comes into contact with the valve sheet part 47, thereby blocking the outflow of salt water and the suction of air (see FIG. 5).

In the regeneration process, the flow detecting means 48 detects the instantaneous flow rate of salt water in the direction of supplying the salt water, i.e., the instantaneous flow rate of salt water flowing from the salt water tank 40 to the ejector 26 through the salt water supply line 31. Then, when the detection value exceeds zero and is less than a predetermined flow rate, the abnormality of regeneration is reported. In this case, the predetermined flow rate is defined on the basis of the instantaneous flow rate of salt water flowing through the salt water supply line 31, for example, when the pressure of raw water is 0.1 MPa, which is required for normally performing the regeneration process.

When the system of supplying salt water, such as the ejector 26 or the salt water strainer 45, is clogged, the ion exchange apparatus 1 cannot consume a predetermined amount of salt water in the regeneration process and may deteriorate the quality of treated water due to a regeneration failure. Therefore, in the first embodiment, on the basis of instantaneous flow rate in the direction of supplying salt water, the abnormality of regeneration is reported to promote early maintenance, thereby increasing the reliability of the regeneration operation. The reporting of regeneration abnormality can be performed by, for example, a buzzer, a liquid crystal display, or an indicator connected to the control device, thereby requesting the user to contact the maintenance center. In addition, the reporting of regeneration abnormality may be directly performed using a communication line from the control device to the maintenance center.

Further, when the detected instantaneous flow rate has become zero during the regeneration process, the regeneration process is terminated and then shifted to the extrusion process. As described above, the outflow of salt water can be blocked when a predetermined amount of salt water is consumed and the air check ball 46 comes into contact with the valve sheet part 47. As a result, the instantaneous flow rate of salt water flowing through the salt water supply line 31 becomes zero, so the time for shifting to the extrusion process can be detected.

In the case of the conventional ion exchange apparatus, both the regeneration process and the extrusion process have been controlled only by the sum of their duration times. In this case, for example, when the pressure of raw water to the ejector 26 is lowered, the time required for consuming salt water increases, thereby causing a reduction in amount of extrusion due to a decrease in time period of the extrusion process. As a result, an extrusion failure may deteriorate the quality of treated water. Therefore, the first embodiment intends to increase the reliability of the regeneration operation by detecting the time period for shifting to the extrusion process on the basis of the instantaneous flow rate in the direction of supplying salt water to ensure a predetermined extrusion amount since the time of initiating the extrusion process.

Further, in the regeneration process, the flow detecting means 48 detects an integrated flow rate in the direction of supplying salt water, i.e., an integrated flow rate from a time at which the regeneration process is initiated to a time at which the detected value of the instantaneous flow rate becomes zero. Subsequently, when a amount of difference between the detection value and a detection value at a time of the last water-refill process, i.e., the amount of refill water supplied to the salt water tank 40, is less than a predetermined amount, a shortage of the solid salt 42 is reported. The detection of an integrated flow rate in the water-refill process will be described later.

In the water-refill process, a predetermined amount of refill water is supplied and sodium chloride, which is the solid salt 42, is then dissolved in the refill water to generate saturated salt water. At this time, the volume of saturated salt water increases 12 to 13% with respect to the amount of refill water to be supplied. The rate of increase is almost constant without depending on temperatures. On the other hand, when the solid salt 42 has been consumed and saturated salt water cannot be generated, the rate of increase becomes less than 12%. Therefore, if the supply of refill water is set to 10 liters for each time in the water-refill process, it can be determined that the solid salt 42 is insufficient when a amount of difference between the consumption amount of salt water and a amount of refill water is less than 1.2 litters.

In the ion exchange apparatus 1, when the solid salt 42 is insufficient, poor regeneration causes deterioration in quality of treated water. Therefore, in the first embodiment, on the basis of both the integrated flow rate in the direction of supplying salt water and the integrated flow rate in the direction of supplying refill water in the last water-refill process, early refill can be facilitated by reporting a shortage of the solid salt 42 to enhance the reliability of the regeneration operation. In this case, the reporting of the shortage of the solid salt 42 to the user may be performed by, for example, a buzzer, a liquid crystal display, or an indicator.

Figure 5:
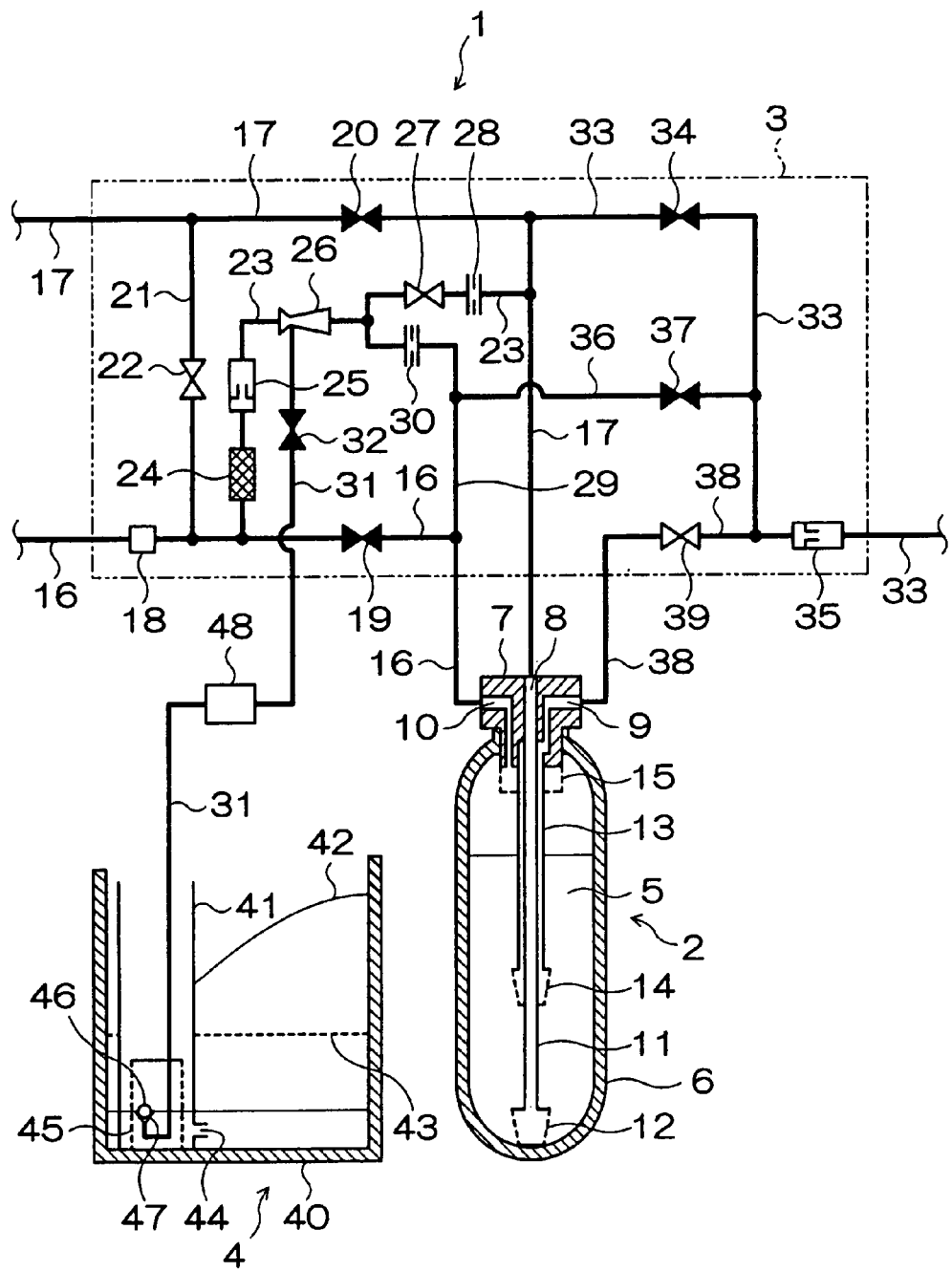
FIG. 5 is a diagram for illustrating an extrusion process of the ion exchange apparatus according to the first embodiment of the present invention.

In the extrusion process, as shown in FIG. 5, according to the command signal from the control device, the third valve 22, the fourth valve 27, and the eighth valve 39 each are set to the open state. On the other hand, the first valve 19, the second valve 20, the fifth valve 32, the sixth valve 34, and the seventh valve 37 each are set to the closed state. Raw water flowing through the raw water line 16 is supplied as extrusion water to a primary side of the ejector 26 through the first regenerant supply line 23. In this case, the strainer 24 removes suspended matters from raw water and the first constant flow valve 25 adjusts the flow rate of raw water within a predetermined range. In addition, the supply of salt water to the ejector 26 is terminated.

Part of raw water from the ejector 26 is supplied through the first regenerant supply line 23, the treated water line 17, the first flow passage 8, and the first header pipe 11 and then distributed from the first screen member 12 at the bottom portion of the resin bed housing part 2. On the other hand, the remainder of raw water from the ejector 26 was supplied through the second regenerant supply line 29, the raw water line 16, and the third flow passage 10 and then distributed from the third screen member 15 at the upper portion of the resin bed housing part 2. In this case, raw water from the ejector 26 is equally distributed by the first orifice 28 and the second orifice 30.

The raw water distributed from the first screen member 12 pushes out regenerant while passing through the cation exchange resin bed 5 with upflow to successively regenerate the lower part of the cation exchange resin bed 5. On the other hand, the raw water distributed from the third screen member 15 extrudes the regenerant while passing through the cation exchange resin bed 5 with downflow to successively regenerate the upper part of the cation exchange resin bed 5. In this case, the raw water of downflow presses the cation exchange resin bed 5 downward, and inhibits the expansion and the fluidization of the cation exchange resin bed 5 caused by the raw water of upflow. Further, the reagent and the raw water passed through the cation exchange resin bed 5 is collected to the second screen member 14 at the middle portion of the cation exchange resin bed 5, and then discharged from the first drain line 33 to the outside of the system through the second header pipe 13, the second flow passage 9, and the third drain line 38. After initiating the extrusion process, when an elapsed time during which the pressure switch 18 is in "ON" state (i.e., the state being in the presence of raw water pressure) reaches to a predetermined time and a predetermined amount of extrusion is secured, the process shifts to the rinsing process.

Figure 6:
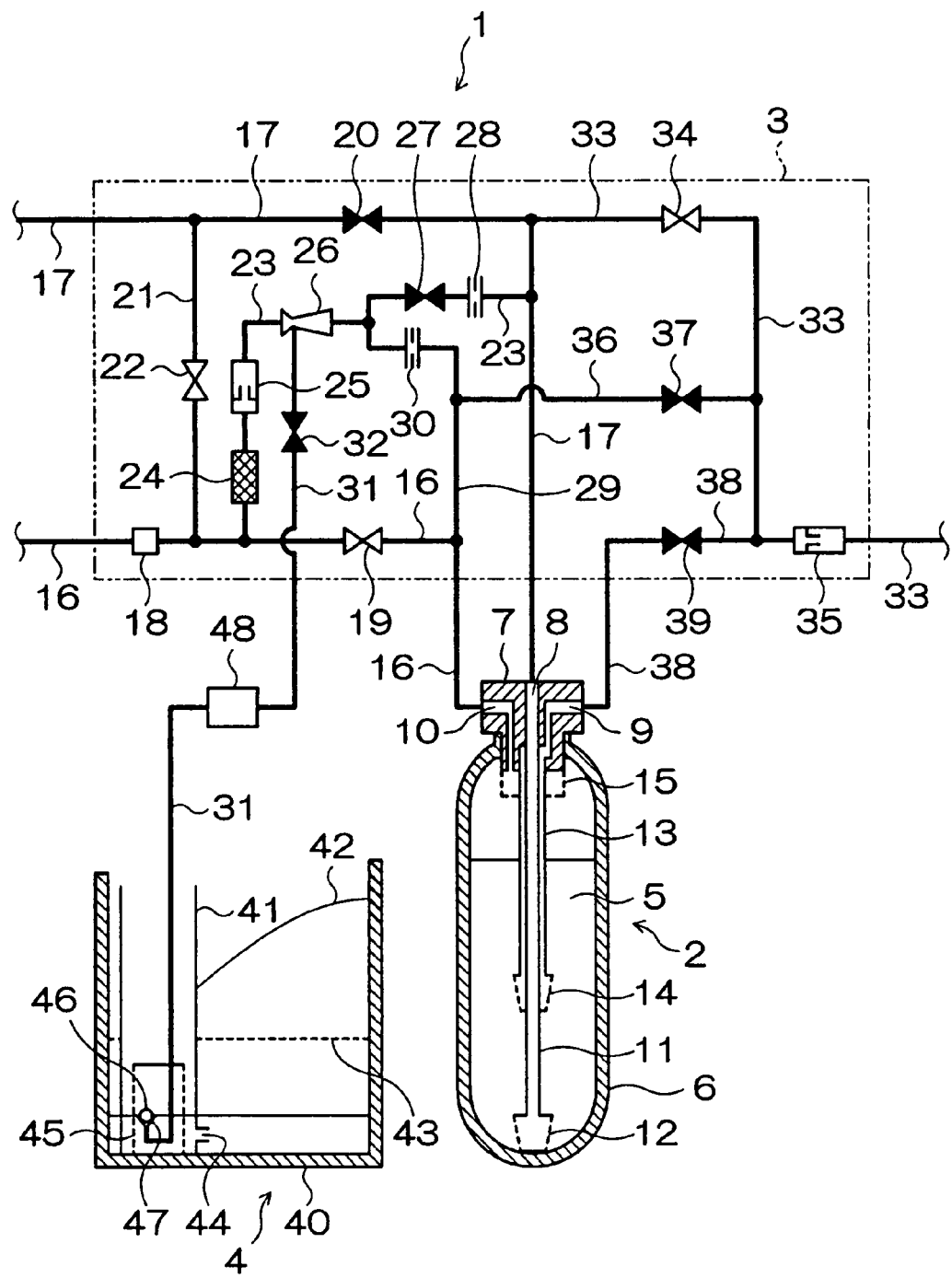
FIG. 6 is a diagram for illustrating a rinsing process of the ion exchange apparatus according to the first embodiment of the present invention.

In the rinsing process, as shown in FIG. 6, according to the command signal from the control device, the first valve 19, the third valve 22, and the sixth valve 34, each are set to the open state. On the other hand, the second valve 20, the fourth valve 27, the fifth valve 32, the seventh valve 37, and the eighth valve 39 each are set to the closed state. Raw water flowing through the raw water line 16 is supplied as rinse water through the third flow passage 10 and then distributed from the third screen member 15 at the upper portion of the resin bed housing part 2.

The raw water distributed from the third screen member 15 rinses off the remaining regenerant from the resin bed housing part 2 while passing through the cation exchange resin bed 5 with downflow. Further, the raw water passed through the cation exchange resin bed 5 is collected to the first screen member 12 at the bottom portion of the resin bed housing part 2 and then discharged to the outside of the system through the first header pipe 11, the first flow passage 8, the treated water line 17, and the first drain line 33. After initiating the rinsing process, when an elapsed time during which the pressure switch 18 is in "ON" state (i.e., the state being in the presence of raw water pressure) reaches to a predetermined time and a predetermined amount of rinse is secured, the process shifts to the water-refill process.

Figure 7:
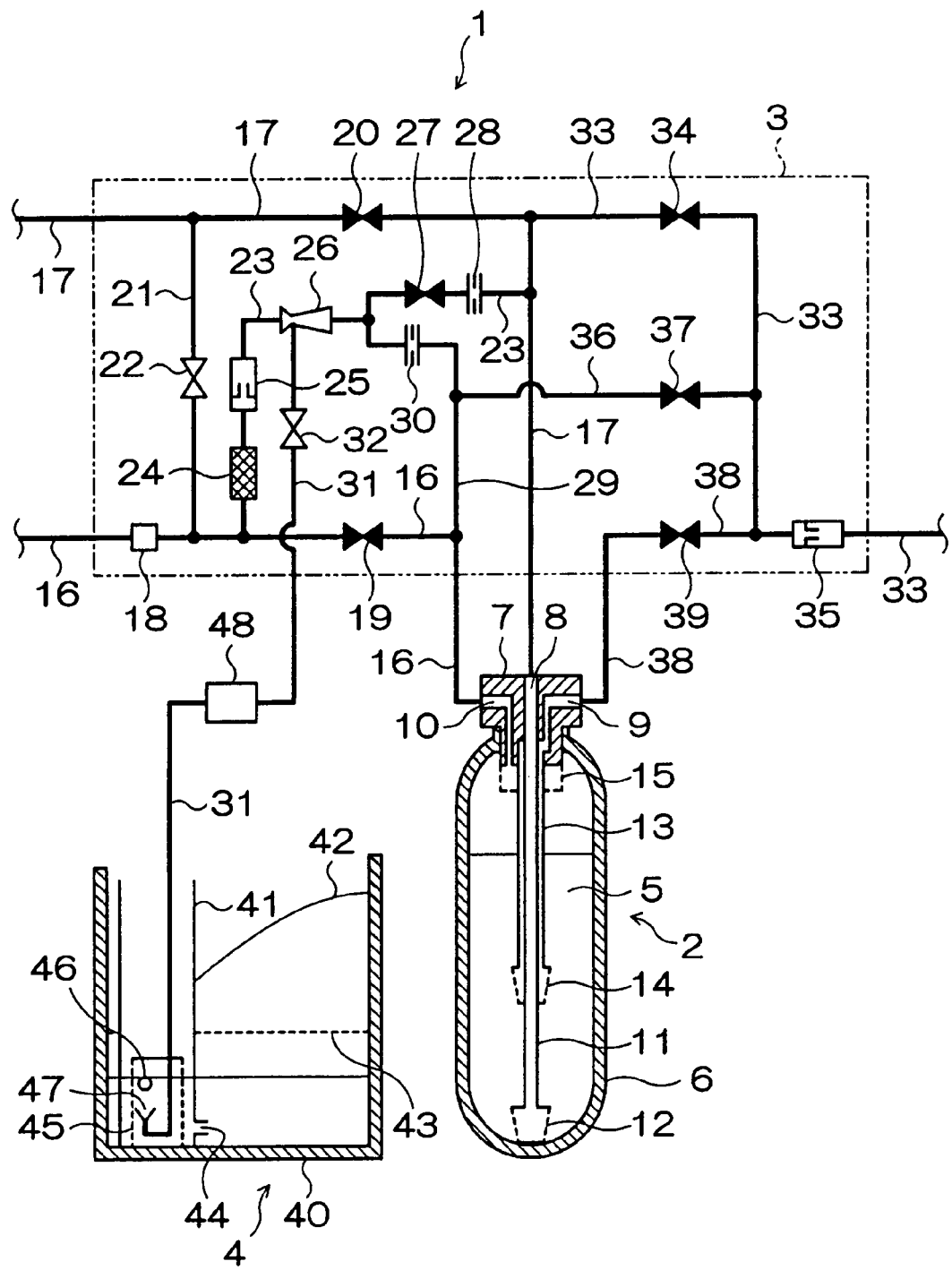
FIG. 7 is a diagram for illustrating a water-refill process of the ion exchange apparatus according to the first embodiment of the present invention.

In the water-refill process, as shown in FIG. 7, according to the command signal from the control device, the third valve 22 and the fifth valve 32 each are set to the open state. On the other hand, the first valve 19, the second valve 20, the fourth valve 27, the sixth valve 34, the seventh valve 37, and the eighth valve 39 each are set to the closed state. Raw water flowing through the raw water line 16 is supplied as refill water to a primary side of the ejector 26 through the first regenerant supply line 23. In this case, the strainer 24 removes suspended matters from the raw water and the first constant flow valve 25 adjusts the flow rate of raw water within a predetermined range.

The refill water from the ejector 26 is supplied to the salt water tank 40 through the salt water supply line 31. In this case, the air check ball 46 detaches from the valve sheet part 47 by pressure of refill water. As a result, refill water is allowed to flow into the salt water tank 40. Further, in the salt water tank 40, the supply of refill water proceeds as the water-refill process proceeds, thereby causing an increase in water level over time.

In the water-refill process, the flow detecting means 48 detects an integrated flow rate in the direction of supplying refill water, i.e., the integrated flow rate of refill water flowing from the ejector 26 to the salt water tank 40 through the salt water supply line 31. Subsequently, when the detected value reaches to a predetermined amount, the water-refill process is then terminated. When the water-refill process is terminated, the water service operation is performed again. The refill water supplied into the salt water tank 40 dissolves the solid salt 42 in the water service operation to generate saturated salt water.

In this case, the amount of refill water to be supplied is defined on the basis of the amount of the solid salt 42 required for recovering the ion-exchanging capacity of the cation exchange resin bed 5 to a predetermined level and the amount required for the generation of saturated salt water is defined on the basis of the required amount. Further, the detected value of integrated flow rate from the time of initiating the water-refill process to the time of terminating the process, i.e., the amount of refill water to be supplied, is utilized in the subsequent regeneration process to determine the insufficiency of solid salt 42.

In the conventional ion exchange apparatus, the amount of refill water to be supplied has been controlled by a salt water valve having a complicated construction. In this case, when a float valve that defines a stopping place of water-refill is firmly fixed with crystalline salt, a predetermined amount of refill water is not supplied, thereby resulting in a shortage of salt water. Further, poor regeneration causes deterioration in quality of treated water. Therefore, in the first embodiment, on the basis of an integrated flow rate in the direction of supplying refill water, the construction of the salt water supply device 4 is simplified by supplying a certain amount of refill water.

By the way, in the regeneration operation, raw water detoured around the resin bed housing part 2 is supplied in response to a request from use points. In the regeneration operation, the third valve 22 is always set in an open state, so raw water flowing through the raw water line 16 located upstream of the first valve 19 is supplied to the treated water line 17 located on downstream of the second valve 20 through the bypass line 21. Therefore, even during the regeneration operation, it is possible to use water at use points. In particular, when the ion exchange apparatuses 1 are arranged in series and the regeneration operation is performed upstream side, soft water is supplied by the water service operation performed downstream side. On the other hand, when the regeneration operation is performed downstream side, soft water is supplied by the water service operation performed upstream side.

According to the first embodiment described above, an ion exchange apparatus capable of increasing the reliability of regeneration operation can be realized. Consequently, it becomes possible to prevent insufficient regeneration and extrusion of an ion exchange resin, and to supply treated water adjusted to a predetermined quality in a stable manner. Further, according to the first embodiment, an ion exchange apparatus having a simplified construction of a salt water supply device can be realized. Consequently, the time required for assembling and maintenance of an ion exchange apparatus can be shortened and costs of production and maintenance can also be reduced.

Second Embodiment

In the first embodiment, the ion-exchanging capacity of the cation exchange resin bed 5 is recovered by split-flow regeneration. Alternatively, however, other regeneration systems may be employed. For examples, co-flow regeneration or counter-flow regeneration, which is generally performed in the art, may be employed to recover the ion-exchanging capacity of the cation exchange resin bed 5.

Third Embodiment

In the first and second embodiments, the supply of salt water from the salt water tank 40 is performed using the ejector 26. Alternatively, however, other means may be employed. For example, the salt water supply line 31 may be provided with a pump (not shown) and the pump may be designed to supply salt water from the salt water tank 40 to the first regenerant supply line 23. In this case, the pump is controlled to be driven at the time of initiating the regeneration process and to be stopped when an instantaneous flow rate in the direction of supplying salt water to be determined by the flow detecting means 48 becomes zero.

Fourth Embodiment

Each of the first, second, and third embodiments was described with respect to the use of the ion exchange apparatus 1 as a water softener. Alternatively, however, the ion exchange apparatus 1 may be used as other kinds of the ion exchange apparatus. For example, in the ion exchange apparatus 1, the cation exchange resin bed 5 may be replaced with an anion ion exchange resin bed so the ion exchange apparatus 1 can be used as a nitrate nitrogen remover.

What is claimed is:

1. An ion exchange apparatus comprising:
   (a) a resin bed housing part in which an ion exchange resin bed is housed;
   (b) a flow passage control valve for switching between a water service operation that supplies raw water with downflow to said ion exchange resin bed and produces soft water and a regeneration operation that recovers capacity of said ion exchange resin bed using salt water, wherein the regeneration operation comprises (i) a backwash process that supplies raw water with upflow to said ion exchange resin bed and washes away captured matter; (ii) a regeneration process that supplies salt water as a regenerant with upflow and/or downflow to said ion exchange resin bed; (iii) an extrusion process that supplies raw water with upflow and/or downflow to said ion exchange resin bed and pushes out the regenerant; (iv) a rinsing process that supplies raw water with downflow to said ion exchange resin bed and rinses off the remaining regenerant; and (v) a water-refill process that supplies raw water as refill water to a salt water tank and generates salt water from a regenerant salt, sequentially;
   (c) a salt water tank for reserving the regenerant salt and salt water to be used in said regeneration process; and
   (d) a salt water supply line for connecting between the flow passage control valve and the salt water tank, wherein the salt water supply line is provided with a flow detector that detects a flow rate in a direction of supplying salt water from said salt water tank and a flow rate of supplying refill water to said salt water tank.

2. An ion exchange apparatus controlling method of controlling the ion exchange apparatus according to claim 1, the method comprising:
   detecting, in the water-refill process, an integrated flow rate in a direction of supplying refill water by the flow detector; and
   terminating the water-refill process when a detected value of said integrated flow rate reaches a predetermined amount.

3. A method of controlling the ion exchange apparatus according to claim 2, further comprising:
   detecting, in the regeneration process, an instantaneous flow rate direction of supplying salt water by the flow detector; and
   reporting abnormal regeneration when a detected value of said instantaneous flow rate exceeds zero and is less than a predetermined flow rate.

4. A method of controlling the ion exchange apparatus according to claim 2, further comprising:
   detecting, in the regeneration process, an instantaneous flow rate in a direction of supplying salt water by the flow detector; and
   terminating the regeneration process and shifting to the extrusion process when a detected value of said instantaneous flow rate equals to zero.

5. A method of controlling the ion exchange apparatus according to claim 3 or 4, further comprising:
   detecting, in the regeneration process, an integrated flow rate of supplying salt water by the flow detector; and
   reporting a shortage of the regenerant salt when an amount of difference between a detected value of said integrated flow rate of supplying salt water and the detected value of the integrated flow rate of supplying refill water detected at a time of the last water-refill process is less than a predetermined amount.

* * * * *